(12) United States Patent
Holt

(10) Patent No.: US 10,995,026 B2
(45) Date of Patent: May 4, 2021

(54) SEPTIC SYSTEM REMEDIATION

(71) Applicant: Aero-Stream, LLC, Hartland, WI (US)

(72) Inventor: Karl K. Holt, Hartland, WI (US)

(73) Assignee: AERO-STREAM, LLC, Hartland, WI (US)

( * ) Notice: Subject to any disclaimer, the term of this patent is extended or adjusted under 35 U.S.C. 154(b) by 0 days.

(21) Appl. No.: 16/516,865

(22) Filed: Jul. 19, 2019

(65) Prior Publication Data

US 2021/0017057 A1 Jan. 21, 2021

(51) Int. Cl.
*C02F 3/06* (2006.01)
*C02F 3/10* (2006.01)
*C02F 3/28* (2006.01)

(52) U.S. Cl.
CPC .............. *C02F 3/2866* (2013.01); *C02F 3/06* (2013.01); *C02F 3/101* (2013.01); *C02F 3/2806* (2013.01); *C02F 2203/006* (2013.01)

(58) Field of Classification Search
CPC .......... C02F 3/06; C02F 3/101; C02F 3/2806; C02F 3/2813; C02F 3/2826; C02F 3/2866; C02F 3/288; E03F 11/00
USPC ............................... 210/615, 150, 151, 532.2
See application file for complete search history.

(56) References Cited

U.S. PATENT DOCUMENTS

| | | | | | |
|---|---|---|---|---|---|
| 4,229,386 | A | * | 10/1980 | Lerner | B01J 19/30 210/150 |
| 4,422,930 | A | * | 12/1983 | Hatanaka | C02F 3/06 210/150 |
| 4,717,519 | A | * | 1/1988 | Sagami | C02F 3/10 210/615 |
| 5,399,266 | A | * | 3/1995 | Hasegawa | C02F 3/103 210/150 |
| 5,468,392 | A | * | 11/1995 | Hanson | C02F 3/06 210/150 |
| 5,897,771 | A | * | 4/1999 | Yoshimura | C02F 3/06 210/150 |
| 7,718,067 | B2 | | 5/2010 | Holt | |
| 2006/0226071 | A1 | * | 10/2006 | Allen | C02F 3/1242 210/532.2 |
| 2007/0151923 | A1 | * | 7/2007 | Haley, III | C02F 3/103 210/615 |
| 2009/0026121 | A1 | * | 1/2009 | James | C02F 3/288 210/532.2 |
| 2009/0032451 | A1 | * | 2/2009 | Tsutsumi | C02F 3/2806 210/150 |
| 2009/0145835 | A1 | * | 6/2009 | Kitao | C02F 3/06 210/336 |
| 2009/0272689 | A1 | * | 11/2009 | Ladouceur | C02F 3/06 210/615 |

* cited by examiner

*Primary Examiner* — Christopher Upton
(74) *Attorney, Agent, or Firm* — Michael Best & Friedrich, LLP

(57) ABSTRACT

A wastewater treatment apparatus for remediation of a wastewater treatment system has a septic tank with a lower sludge layer and an upper liquid effluent layer. The apparatus is comprised of a brush that includes a brush arm having a first end, a second end, and bristles disposed on the brush arm between the first end and the second end. The brush is configured to be positioned within the liquid effluent layer in the septic tank in a vertical orientation such that the second end is disposed below the first end.

16 Claims, 5 Drawing Sheets

SEPTIC SYSTEM REMEDIATION

BACKGROUND

The present invention relates generally to septic systems and to the components that make up such systems. More particularly, it relates to an improved method and apparatus for remediating the formation of a bio-mat that can occur in the absorption field component of a private on-site wastewater treatment system.

Septic systems and septic system components are well known in the art. Such systems are typically found in relatively sparsely populated areas not otherwise serviced by municipal waste water systems. However, septic systems are also frequently used in developing countries even in very populous areas. In populous areas, the combination of high user loads and poor maintenance can lead to problems.

The purpose of a septic system is to dispose of the wastewater that is generated by the occupants of a home or other building in such a manner that surrounding soils can be used to disperse the wastewater without causing an adverse effect on ground water and, in turn, on public health and the environment in general. To accomplish this task, septic systems normally include a septic tank, a distribution system and a leaching system.

The septic tank is connected to the plumbing of a home or building by a sewer line. The septic tank provides a holding area for the settling of waste solids and for some initial treatment of the waste. Some septic tanks are constructed with porous walls and or bottoms with or without an outlet pipe. These tanks are commonly known as cesspools. These tanks provide a holding area for the solids and allow the liquids to flow through the porous walls and or bottom. This type of system provides both a means of accumulating solids (a tank) and the distribution of treated effluent (a seepage pit). Generally, septic tanks have baffles to slow the velocity of the liquid moving through the tank and to prevent solids from leaving the tank. In this way, properly functioning septic tanks produce an effluent of fairly uniform quality.

The effluent then moves to a distribution system that directs the flow of effluent from the septic tank to the leaching system. Most systems take advantage of gravity, meaning that flow runs through piping and distribution boxes without the assistance of any mechanical device such as a pump. The leaching system disperses the sewage effluent over an underground area and into the surrounding natural soils. There are several types of leaching systems and the specific type used often depends on the surrounding soil conditions. Most residential leaching systems use stone-filled leaching trenches, but galleries, pits, and beds have also been used.

Typically, private on-site wastewater treatment systems have finite lifetimes due to many factors including household water use, excessive introduction of chemicals into the waste stream, poor maintenance, and environmental factors. Replacement of any septic system component that may be required to deal with remediation of the entire system can be extremely expensive. The reason for this is the fact that the septic system components, for the most part, are buried underground and are largely inaccessible.

A significant factor is that passive septic systems typically rely on the presence of indigenous anaerobic bacteria to break down the solid waste introduced to the system. As solid waste enters the septic tank, it flows through the series of baffles that are designed to reduce the velocity of the flow as previously described. Generally, three identifiable layers occur in a septic tank. The first layer is generally known as sludge, and includes solid wastes that precipitate out of the flow to the bottom of the septic tank. The intermediate layer is liquid effluent that generally includes liquids and solids partially broken down into liquids by the anaerobic bacteria that are present in the septic tank. This intermediate layer is drained off to the absorption field. The top layer in the septic tank is generally known as the scum layer. The scum layer generally includes residual detergents, soaps, fats, and oils and has a tendency to float at the top of the septic tank. Optimally, the septic tank is designed such that only the partially treated liquid effluent is permitted to leave the septic tank for the absorption field. Unfortunately, this is not always the case.

Anaerobic bacteria thrive in conditions such as those that exist at the bottom of a septic system where oxygen is lacking. Accordingly, septic systems are designed to have the capacity to treat a certain amount of solid wastes based on the capability of the indigenous bacteria to break down the solid waste over a certain period of time. Therefore, the average amount of solid waste produced per day should be approximately equal to the amount that the anaerobic bacteria can break down in one day.

Aerobic bacteria are also indigenous and are found naturally within the waste stream. Aerobic bacteria, however, exist and function only where oxygen is present. While aerobic bacteria typically break down solid wastes more quickly than anaerobic bacteria, they are ineffective at breaking down sludge, or the solid layer at the bottom of the septic tank because there is no oxygen present in that layer. Due to significant installation and operating costs, aerobic systems that would otherwise eliminate this sludge layer are not favored for home use.

As anaerobic bacteria digest solids suspended in the effluent as they make their way to the absorption field or in the absorption field, the suspended solids and accompanying bacteria are then deposited at the interface between the absorption field and the soil surrounding the system. This layer is known as the "bio-mat" and this layer further filters the effluent. Unfortunately, the bio-mat layer can grow to a thickness where it completely, or almost completely, impedes absorption.

While there are many ways in which septic systems can fail, one of the most likely modes of failure includes the creation and thickening of a bio-mat layer at the absorption field due to the decomposition of solids within the effluent. Another mode of failure includes excess sludge and scum from the septic tank that builds up in the bio-mat. For example, the septic tank fills with sludge when the rate of decomposition caused by the anaerobic bacteria is incapable of keeping up with the rate of solids draining into the system. The scum level at the top of the tank takes up more space as the sludge level gets higher. This causes the liquid effluent to run through the septic tank more quickly, which prevents solids from settling. The solids that fail to settle in the septic tank proceed to the absorption system, where they frequently plug the pores in the soil used for absorption. The scum layer can also find its way out of the septic tank and similarly prevents soil absorption. If too much of the absorption field is plugged by scum and solids, the effluent will actually back up in the absorption area and cause muddy spots in the area above the absorption field. This is a sign that the absorption field has failed and causes an extremely malodorous and unsightly condition.

Replacement of soil absorption systems is costly and heavily regulated due to the threat that malfunctioning systems pose to groundwater. Replacement systems (e.g., converting to an active system, creating an above-grade soil absorption system, or holding tanks) are also very expensive.

Frequently, a failing or failed soil absorption system can be remediated with the support of naturally occurring aerobic bacteria in the system. In theory, an aerobic system could eliminate or substantially reduce the failure rate of an absorption field. Unfortunately, aerobic bacteria also require the introduction of oxygen into the waste stream. Temporary introduction of oxygen into a failed or failing soil absorption field for the purpose of converting the biochemical process from an anaerobic one to an aerobic one has been previously identified in published U.S. application Ser. No. 10/764,245 (assigned to Aero-Stream, LLC). The '245 application discloses that forced introduction of oxygen into the system would allow the aerobic bacteria to scour the bio-mat, which reduces the thickness and/or increases the permeability of the bio-mat and permits the system to revert back to an anaerobic passive system as originally designed. There is also a need to alter the biochemical process by conversion of the complete soil absorption component or a localized area of it.

Forced introduction of ozone gas also can improve performance of the remediation process. For example, U.S. application Ser. No. 10/930,148 (assigned to Aero-Stream, LLC) discloses the use of ozone for septic system remediation. Ozone, also known as triatomic oxygen or $O_3$, is itself a powerful oxidizing agent. In nature, ozone is created when the electrical current of lightning transforms diatomic oxygen molecules, or $O_2$, into activated triatomic oxygen. However, ozone, also is an unstable gas which, at normal temperatures and under all ordinary conditions, spontaneously decomposes to diatomic oxygen. This decomposition is accelerated by solid surfaces and by many chemical substances. For this reason, ozone is not encountered except in the immediate vicinity of where it is formed. That is, ozone cannot be stored and must be generated on-site. When ozone is introduced into the system, some of the ozone decomposes bio-degradable matter in the system. The balance of the available ozone rapidly decomposes to oxygen and is available for consumption by the aerobic bacteria.

One significant problem with existing remediation systems is that the air and/or oxygen or ozone that is introduced into the system simply bubbles to the surface of the tank.

SUMMARY

Normally, air bubbles emitted in a liquid medium combine to form larger bubbles. The present invention optimizes growth of bacteria by generating oxygen-inclusive microbubbles and retaining a significant portion of the microbubbles in the tank via suspension to increase the growth of aerobic bacteria. Providing a concentrated oxygen environment that is suspended in an area including aerobic bacteria will allow the bacteria to further clean the wastewater and thus remediate the septic system.

For example, in one embodiment, a wastewater treatment system has a septic tank with a lower sludge layer and an upper liquid effluent layer. The wastewater treatment apparatus comprises a brush including a brush arm having a first end, a second end, and bristles disposed on the brush arm between the first end and the second end. The brush is configured to be positioned within the liquid effluent in the septic tank in a vertical orientation such that the second end is disposed below the first end.

In another embodiment, a wastewater treatment apparatus for remediation of a wastewater treatment system has a septic tank with a lower sludge layer and an upper liquid effluent layer. The wastewater treatment apparatus comprises brushes including brush arms each having a first end, a second end, and bristles disposed on each of the brush arms between the first end and the second end. The brushes are configured to be positioned within the liquid effluent in the septic tank in a spaced apart manner. The brushes are configured to be oriented substantially vertically within the liquid effluent.

Another embodiment includes a method of remediating a wastewater treatment. The wastewater treatment system having a septic tank with a lower sludge layer and an upper liquid effluent layer. The method includes, positioning one or more brushes within the liquid effluent layer with each of the one or more brushes including one or more brush arms having a first end, a second end, and bristles disposed between the first end and the second end. The method further includes, orienting each of the one or more brushes substantially vertically within the liquid effluent layer.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Terms of degree, such as "substantially" or "approximately" are understood by those of ordinary skill to refer to reasonable ranges outside of the given value, for example, general tolerances associated with manufacturing, assembly, and use of the described embodiments.

In general, there are three types of aeration treatment units. There are suspended growth units, attached growth units, or a combination of the two. Suspended growth units are the most used aerobic units. Suspended growth units consist of an aeration chamber where air is mixed with wastewater. The aeration chamber contains a pump or a compressor to bring into the wastewater so it can be used by the bacteria. The bacteria are kept in suspension in the aeration chamber, and air is mixed with the effluent. The bacteria digest the solids in the wastewater or effluent and turn it into new bacteria cells, carbon dioxide, and water. Attached growth units treat wastewater by providing a surface for bacteria growth. The bacteria-covered surface is introduced to the wastewater and the air alternately. These units sometimes contain fixed or floating cylinders or spheres that move around in the wastewater. Pretreatment is required for attached growth units. An advantage to attached growth units is that there is no mixing of air in the wastewater. The invention described herein takes advantage of both methods. The present invention provides for suspended growth in that all of the oxygen is not captured by the attached growth brushes. Additionally, as described in detail below, attached growth is the growth provided for on brushes that are suspended in the liquid effluent layer.

Figure 1:
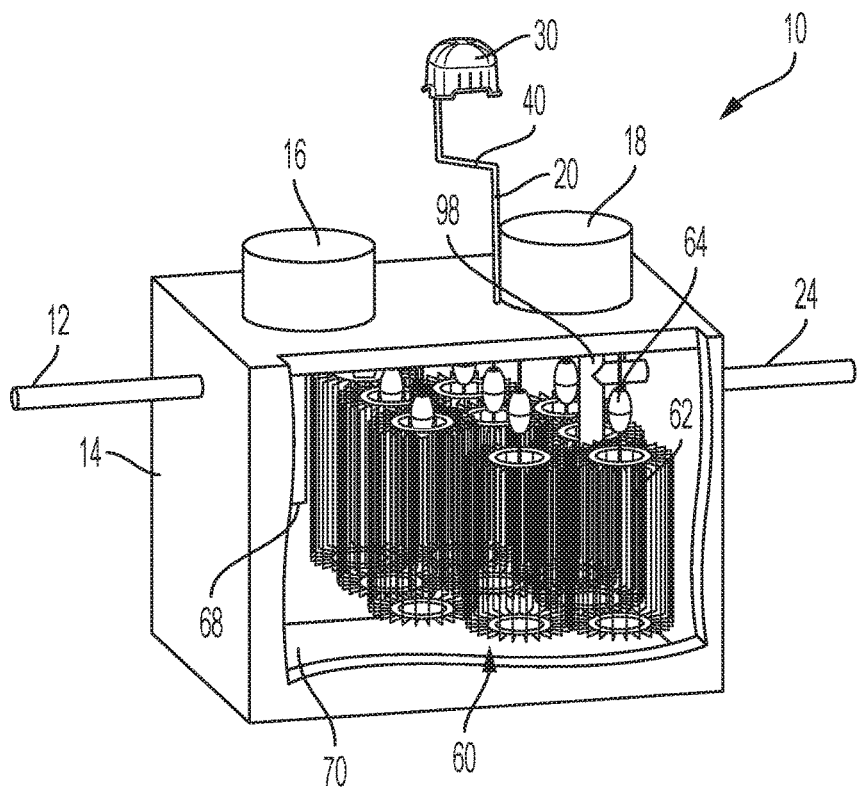
FIG. 1 is a perspective view of an exemplary septic system including a tank and brushes positioned within the tank.
Figure 2:
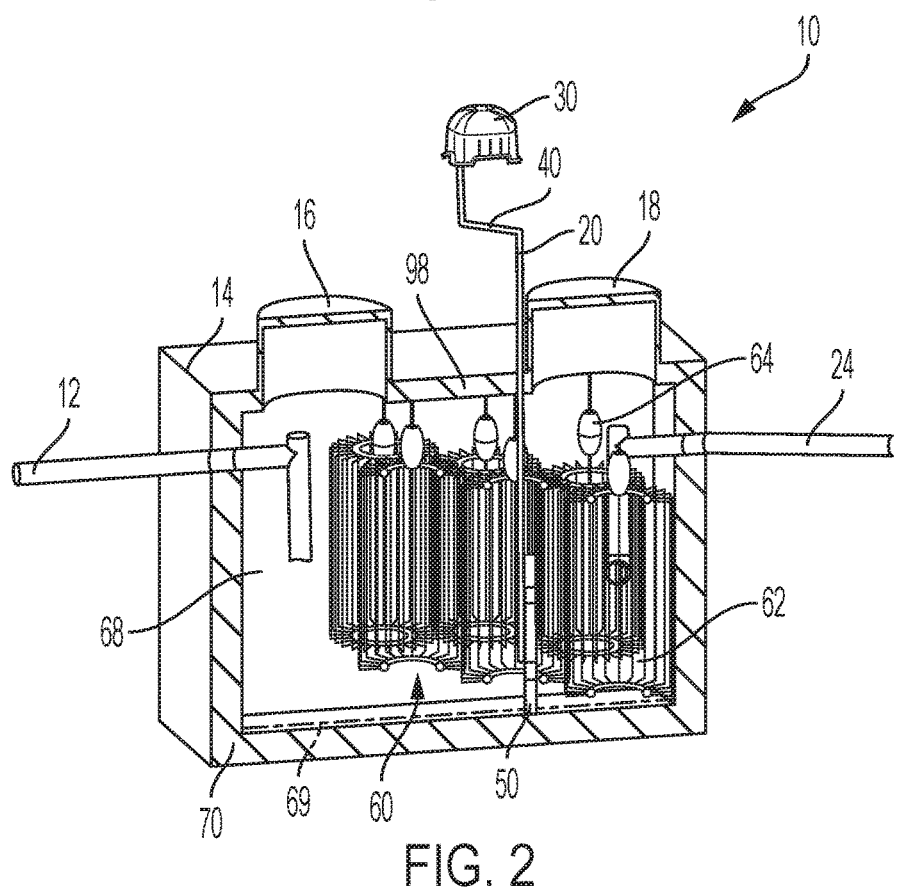
FIG. 2 is a section view of the septic system of FIG. 1 illustrating the brushes and piping within the tank.

FIGS. 1 and 2 illustrates an exemplary septic system 10 that lies, at least for the most part, below earth grade. The septic system 10 includes a pipe leading from a home or building (not shown), and the pipe 12 is connected to a tank 14. The tank 14 may or may not have a vented cover. The tank 14 may include risers 16, 18 and a vent 20. As will become apparent later in this detailed description, if the tank 14 does not have the vented cover 20 atop of the risers 16, one may need to be added to utilize the apparatus of the present invention. The tank 14 is, in turn, connected to a dry well or seepage pit (not shown), or connected to an absorption field or an above-grade mounted system (not shown), via an outlet pipe 24.

With continued reference to FIGS. 1 and 2, the septic system also includes a high volume air pump or ozone generating pump 30 that is connected to a low pressure drop sintered air stone 50 (FIG. 2), which has a relatively large surface area. The system 10 may include additional pumps 30 to generate air, oxygen, ozone, or a combination thereof (referred to collectively as 'air' for purposes of the description and the claims), and additional air stones 50 depending on the design of the system 10. It will be appreciated that only one ozone or oxygen-generating pump 30 is necessary in some systems, and that in systems with multiple pumps, the additional pumps may be non-ozone generating pumps. In embodiments with multiple air stones 50, the air stones 50 are placed at various locations inside the septic system 10. The pump 30 forces air, oxygen, ozone, or a combination thereof, into tubing or aeration lines 40 (e.g., clear vinyl, other types of tubing) that are connected to the air stone(s) 50 to direct air to the air stone(s) 50. The matrix of the aeration lines 40 in the system determines the number of air stones 50 that may be used. In other words, if the aeration lines 50 include branches, the air stones 50 may be coupled to each branch in the aeration lines 50. The aeration lines 40 are positioned in the vent pipe of the tank 14, although the lines 40 can be positioned in other locations. The air stone 50 and a portion of the aeration lines 40 are inserted into the tank 14 via the tank vent 20 when the aeration lines 40 are located in the vent pipe.

As shown in FIGS. 1-6, the system 10 further includes an oxygen or ozone retaining apparatus 60 with brushes or brush assemblies 62. The brush 62 is suspended around the air stone 50 using a float 64 in a liquid effluent layer 68 above a sludge layer 69 that accumulates on a bottom surface 70 of a tank 14. As shown, space between the bottom of the brush 62 and the sludge layer 69 creates a non-baffled gap that allows free movement of microbial flocks or bacteria between the effluent layer 68 and the sludge layer 69 (e.g., between the biological phases created in the tank system). In other words, the gap below the brush 62 allows bacteria to travel from the effluent layer 68 to the sludge layer 69 (e.g., via gravitational force). With the brush 62 surrounding the air stone 50 in the effluent layer 68, the air stone 50 is held in the effluent layer 68 such that the air stone 50 does not rest on the sludge layer 68 and emits bubbles into the effluent layer 68 from all sides. The brushes 62 slow the flow of the air as it bubbles upward to provide increase oxygen availability for the aerobic bacteria.

Figure 7:
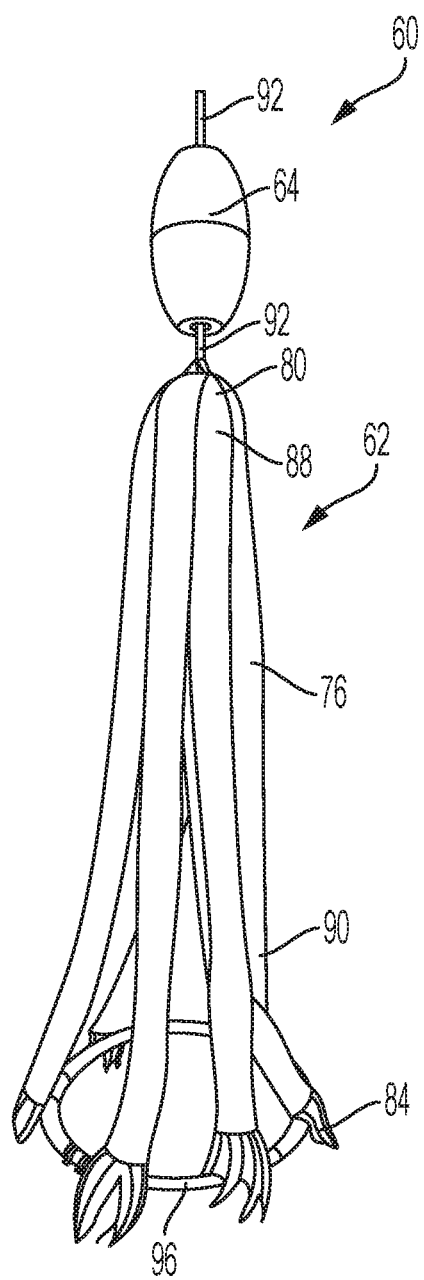
FIG. 7 is a view of one brush including the float and brush arms extending downward from the float and connected at distal ends to a connector.

With reference to FIG. 7, each brush 62 includes a plurality of brush arms 76, although one or more brushes 62 can have a single brush arm 76 in some embodiments. Each brush arm 76 has a first end 80, a second end 84, and bristles 88 that are disposed on the brush arm 76 between the first end 80 and the second end 84. The bristles 88 may be fabricated from synthetic material (e.g., polyvinyl, chloride, polyurethane, polyethylene, nylon, etc.) or natural material (e.g., coconut fibers, etc.), and the bristles 88 can have fibers (natural or synthetic) of random length, shape, sectional area, and texture. The randomness a brush that, in general, tends to retain more oxygen than synthetic fibers. As illustrated, the bristles 88 are defined by perforated and flexible three-dimensional tubules that are packed into a cylindrical bundle to create the brush arm 76. The bristles 88 can be tied in the middle or in other areas to maintain a relatively tight bundle within which bristles 88 are generally spaced equidistant from each other. Air bubbles enter the perforated, flexible bundle of tubules to create a bottleneck effect for the bubbles, which delays the release of air bubbles out of the water and allows significantly enhanced oxygen transfer in the septic tank 14. In the illustrated embodiment, a casing 90 is shown. The casing 90 is used during shipment to maintain the tight bundle of each brush arm 76 during transport. Before use, the casing 90 is removed from each brush arm 76. The casing 90 may be a plastic material, or the like.

The first end 80 of each brush arm 76 is connected to the float 64 via a tie line 92 such that one tie line 92 is used to attach the plurality of brush arms 76 to the float 64. It will be appreciated that several tie lines 92 may be used to attach the brush arms 76 to the float 64 (or multiple floats). In the depicted embodiment, the tie line 92 has a main stem that extends through the float 64 such that the float 64 is oriented substantially (almost) vertical in the use position of the brush arms 76. In other embodiments, the float 64 may include a generally vertical orientation relative to the direction in which the brush arms 76 extend. In other words, the float 64 is free slide up and down along the tie line 92 when the brush arms 76 are in the use position. In further embodiments, the float 64 may be substantially (almost) horizontal, horizontal relative to the direction in which the brush arms 76 extend, or any alternate orientation relative to the direction in which the brush arms 76 extend.

As shown, the second end 84 of each brush arm 76 is coupled to a spacer or connector 96 (illustrated as a hoop in FIG. 7). In the illustrated embodiment, the second ends 84 are spaced apart from each other along a circumference of the connector 96. The connector 96 acts as a spacer for the brush arms 76 and can have any shape (e.g., a line, circular, square, triangular, other polygonal shapes, etc.) that allows the second ends 84 to be spaced apart from each other when the brush is in use. In some constructions, the brush 62 may not have a connector adjacent the second end 84 or any other type of spacer, or the brush arms 76 may be spaced apart in other ways. For example, individual spacers may be positioned between adjacent brush arms 76, or each brush arm 76 may have a semi-rigid or rigid 'spine' so that the arms 76 angle generally away from each other.

Figure 8:
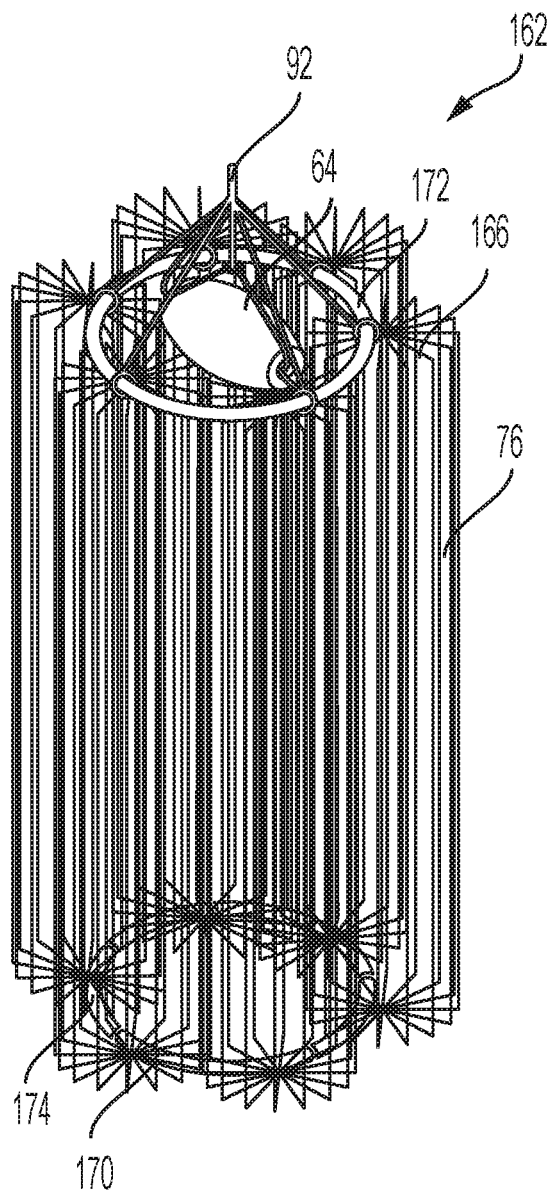
FIG. 8 is a view of another brush including the float and brush arms extending downward from the float and connected at first ends and second ends to connectors.

FIG. 8 illustrates another exemplary brush 162 having the plurality of brush arms 76 connected to the float 64 via the tie line 92. The brush 162 is similar to the brush 62 described above, and only the differences between the brush 162 and the brush 62 above are described in detail below.

Each of the plurality of brush arms 76 include a first end 166 and a second end 170. The first end 166 of each brush arm 76 is coupled to a first connector 172 (illustrated as a top hoop in FIG. 8). In the illustrated embodiment, the first ends 166 are spaced apart from each other along a circumference of the first connector 172. The tie line 92 is secured to the first connector 172 adjacent each of the first ends 166. Also, the tie line 92 illustrated in FIG. 8 has a float extension that extends downward from the main stem of the tie line 92 and through the float 64 such that the float 64 is oriented horizontal or substantially (almost) horizontal in the use position of the brush arms 76. In some embodiments, such as illustrated with regard to FIG. 7, the float 64 may be oriented vertical or substantially (almost) vertical in the use position of the brush arms 76. The second end 170 of each brush arm 76 is coupled to a second connector 174 (illustrated as a bottom hoop in FIG. 8). In the illustrated embodiment, the second ends 170 are spaced apart from each other along a circumference of the second connector 174. The diameter of the illustrated second connector 174 is the same as the diameter of the first connector 172 so that each brush arm 76 is oriented generally vertical. In some embodiments, the diameters of the first connector 172 and the second connector 174 can be different.

When the brushes 62, 162 are placed in the tank 14, the brush 62 is positioned in the effluent layer 68 in the tank 14 so that the brushes 62, 162 generally have a vertical orientation. Stated another way, the second ends 84 of the brush arms 76 are oriented below the respective first ends 80 when the brushes 62, 162 are placed in the tank 14. The tie line 92 extends through the float 64 (such that the float 64 can slide on the tie line 92) and is secured to a top wall 98 of the tank 14. The brush arms 76 hang or suspend from the float 64. The connector 96 acts as a weight to maintain the brush arms 76 in the generally vertical orientation, maintains tension on the brush arms 76, and prevents significant movement of the brush arms 76 while also separating the brush arms 76 from each other. For purposes of the claims, 'generally vertical' is intended to mean that the brush arms 76 extend downward from the first end 80 in a vertical direction or at an angle of 75 degrees or less relative to vertical.

By suspending the brushes 62, 162 via the float 64 in a generally vertical orientation around the air stone 50, air bubbles that emanate from the air stone 50 contact the brushes 62, 162 and are held, at least momentarily, on the bristles 88 and/or break apart into smaller bubbles to feed the aerobic bacteria. As explained above, this arrangement of the brush arms 76 creates a bottleneck effect in relation to the air bubbles, delaying the release of the air bubbles out of the effluent layer 68 and allowing enhanced oxygenation to occur. The oxygenation of the effluent layer 68 allows the aerobic bacteria to thrive and multiply. The brushes 62, 162 may be of a different shape or size, although it is preferable that the brush 62 have a large surface area to capture and contain more oxygen to support the growth and multiplication of aerobic bacteria.

Figure 3:
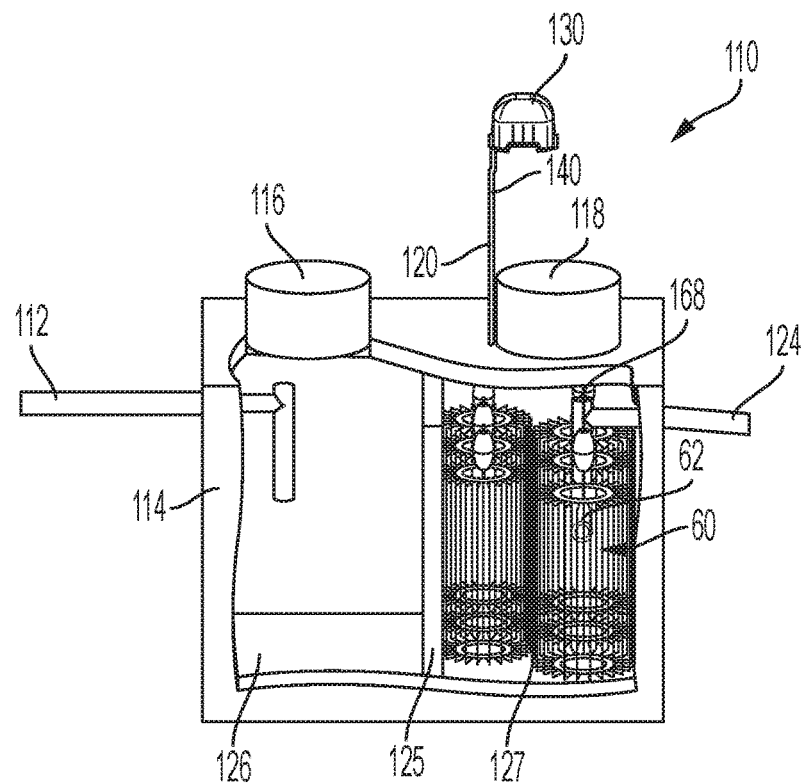
FIG. 3 is a perspective view of another exemplary septic system including a first tank and a second tank separated from the first tank by a divider and located downstream of the first tank, and brushes positioned within the second tank.
Figure 4:
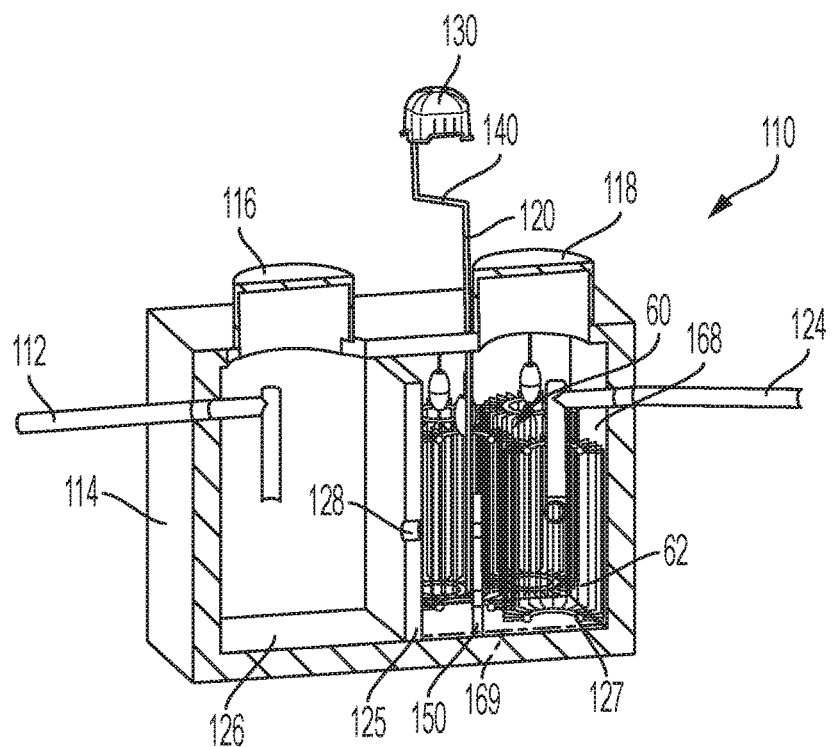
FIG. 4 is a section view of the septic system of FIG. 3 illustrating the brushes and piping within the second tank.

FIGS. 3 and 4 illustrate another exemplary septic system 110 including the oxygen or ozone retaining apparatus 60 with the brushes or brush assemblies 62. The septic system 110 is similar to the septic system 10 described above, and only differences between the septic system 10 and the septic system 110 are described in detail. The remaining features are the same as described with regard to FIGS. 1, 2, and 7.

The septic system 110 includes a pipe 112 leading from a home or building and the pipe 112 is connected to a tank 114. The tank 114 differs from the previously disclosed embodiment in that the tank 114 includes a divider 125 in the center of the tank that separates the tank into a first portion 126 and a second portion 127. The first portion 126 and the second portion 127 are fluidly connected via an opening 128 in the divider 125. The tank 114 includes risers 116, 118 and a vented cover 120.

The second portion 127 of the tank 114 is connected to a dry well or seepage pit (not shown) via an outlet pipe 124. A pump 130, a tubing 140, and an air stone 150 may be used with the second portion of the tank through insertion of the tubing 140 via the tank vent 120 of the second portion 127. The brushes 62, 162 are displaced in the second portion 127 of the tank 114 such that the brushes 62, 162 are vertically oriented in a liquid effluent layer 168 for aerobic bacteria production around the air stone 150 and above a sludge layer 169, in a similar manner to that of the embodiment of FIGS. 1 and 2.

Figure 5:
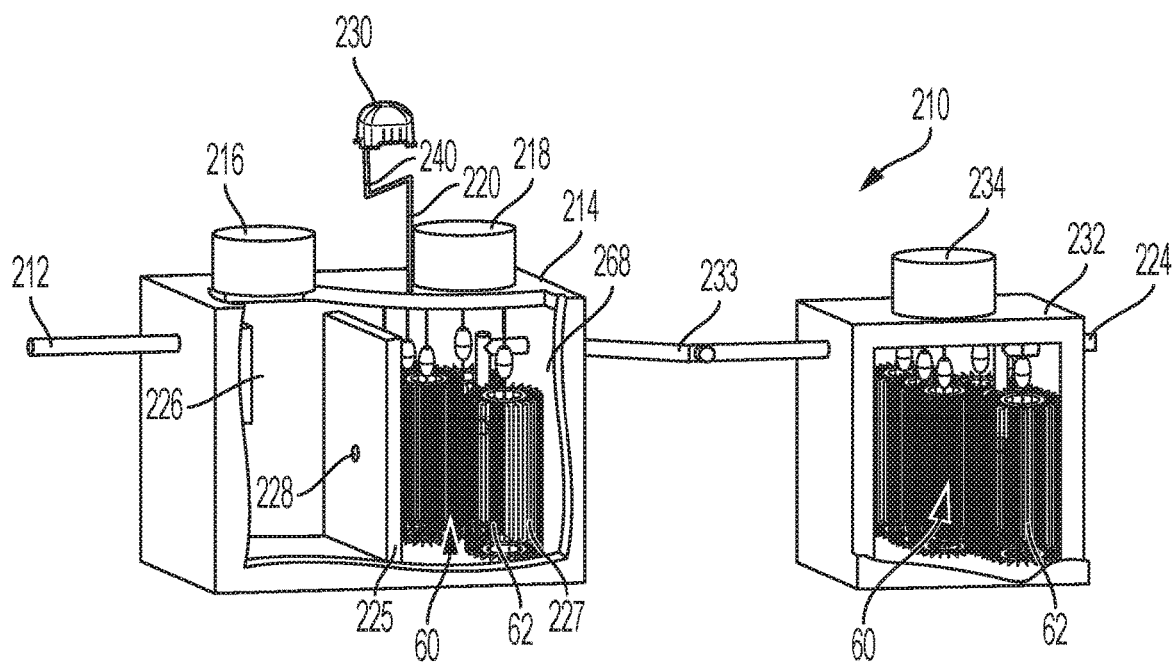
FIG. 5 is a perspective view of another exemplary septic system including a first tank, a second tank separated from the first tank by a divider and located downstream of the first tank, a third tank located downstream of the second tank and connected to the second tank by piping, and brushes positioned within the second tank and the third tank.
Figure 6:
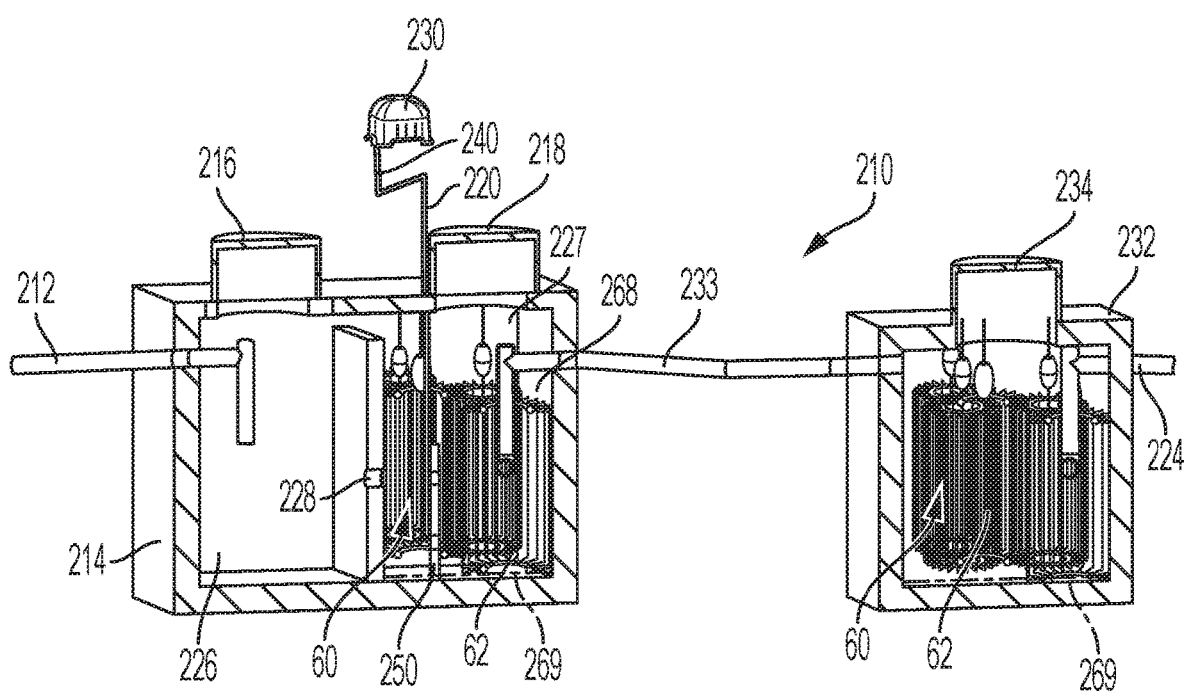
FIG. 6 is a section view of the septic system of FIG. 5 illustrating the brushes and piping within the second tank and the third tank.

FIGS. 5 and 6 illustrate another exemplary septic system 210 including the oxygen or ozone retaining apparatus 62 with the brushes or brush assemblies 60. The septic system 210 is similar to the septic systems 10, 110 described above, and only the differences between the septic system 210 and the septic systems 10, 110 above are described in detail below.

The system 210 includes a pipe 212 leading from a home or building (not shown) and the pipe 212 is connected to a first tank 214. The first tank 214 includes a divider 225 in the center of the tank 214 that separates the tank 214 into a first portion 226 and a second portion 227. The first portion 226 and the second portion 227 are fluidly connected via an opening 228 in the divider 225. The first tank 214 includes risers 216, 218 with a vented cover 220.

The second portion 227 of the first tank 214 is, in turn, connected to a second tank 232 via a pipe 233. The second tank 232 is then connected to a dry well or seepage pit (not shown) via an outlet pipe 224. A pump 230, a tubing 240, and an air stone 250 may be used with the second portion 227 of the first tank 214 through insertion of the tubing 240 via the tank vent 220 of the second portion 227, and/or with the second tank 232 through insertion of the tubing 240 via a tank vent 242 of the second tank 232. The brushes 62, 162 are displaced within the second portion 227 of the first tank 214 and the second tank 232 such that the brushes 62, 162 are vertically oriented in a liquid effluent layer 268 for aerobic bacteria production around the air stones 250 and above a sludge layer 169, in a similar manner to that of the embodiment of FIGS. 1 and 2.

It is to be understood that the improved apparatus of the present invention could be installed in alternate locations other than the embodiments disclosed above. For example, the aeration lines could be installed in the final septic tank or pumping chamber of a multiple tank system 10, 110, 210 or in the septic tank in a single tank system immediately prior to the outlet to the soil absorption system 10, 110, 210. As an alternate to installing through a vented cover, small holes can be drilled through the lid of the tank or compartment and the aeration lines installed. Installation of an approved effluent filter or a bristled filter brush is recommended with this application method.

Remediation is a lengthy process. However, the oxygen or ozone retaining apparatus 62 provides some degree of more immediate remediation compared to existing systems. Substantial remediation can occur in most systems (e.g., septic systems 10, 110, 210) within about 6 months, although remediation may take as long as one year. If, even then, the system is not completely remediated, the equipment can be operated for longer periods without detrimental effects to the system. One advantage to the use of at least one ozone-generating pump 30 within the septic system is that the application of ozone to any medium, liquid or gas, does not add other chemicals to the septic system In the experience of this inventor, the length of time needed to remediate a failing or failed absorption field depends on several factors, including, but not limited to, system type, size, severity of failure, site conditions, precipitation, and the average temperature during the remediation process. Several trials have been conducted that show the influences of these conditions. All trials showed successful application of the remediation program using the brushes described above. The trials showed little change in measured effluent in the absorption system during the first several days of remediation. The following weeks showed a significant drop in effluent levels. Over time, the rate of effluent reduction decays. Rapid effluent drop near the top of the absorption system is to be expected as it is not normally used until the lower levels become plugged and the effluent levels begin to rise. Daily specific hydraulic loading and local precipitation had similar effects on all systems.

In the event that a septic system does not have a vent at a convenient location to monitor the progress of the remediation method, a monitoring well can be added to a conventional soil absorption system by driving a "sandpoint" well point not less than 12 inches and not more than 24 inches below the bottom of the soil absorption vent pipe. The bottom of the "sandpoint" should be driven to the bottom of the soil absorption field. Therefore, the effluent level in the "sandpoint" can then be monitored.

This improved process and apparatus can be applied to the effluent contained in a holding tank. In this application, the effluent category can be changed from untreated waste to treated waste. This recategorization may reduce the pumping cost associated with the holding tank. Typically, untreated waste of a holding tank must be disposed of in a waste treatment facility. The waste treatment facility charges the waste hauler for this service, who in turn charges the owner of the holding tank. Treated waste can be alternatively distributed into the surface of the ground at less cost.

Yet another application of this improved process and equipment is in mobile and portable holding tanks. Mobile and portable holding tanks can be found in, but are not limited to recreational vehicles, camping trailers, boats, etc. These holding tanks are anaerobic in nature and emit odorful methane gases. Owners typically add chemical odor controllers containing paraformaldehyde, alkyl dimethyl benzyl ammonium chloride (quaternary ammonium) or other disinfectants. These chemicals are toxic and detrimental to a private on-site wastewater treatment system. Many rural campgrounds are serviced by a private on-site wastewater treatment system. Many campgrounds discourage or have banned the use of these additives. As alluded to earlier, the application of ozone to any medium does not add any other chemicals. In this application, the naturally occurring aerobic bacteria can eliminate the odors of a blackwater or sewage holding tank. In fact, ozone in its gaseous state is a proven deodorizer for a variety of odorous materials. Ozone also has the proven ability to convert biorefractory organic materials to biodegradable materials. Thus, ozone oxidation can produce wastewater with lower concentrations of problematic organic compounds. The equipment will keep the holding tank significantly free of sludge build up on the sidewalls and depth sensors. Application of this improved process to the gray water holding tank will also eliminate odor, keeps the holding tank free of sludge build up on the sidewalls and depth sensors. This treated gray water is then suitable for the use of flushing the toilet.

Based on the foregoing, it will be apparent that there has been provided an improved apparatus and method for introducing and retaining oxygen and ozone, or ozone only, into the effluent layer of a septic tank by suspending an oxygen delivering device in the effluent and providing for an oxygen retaining mechanism such as a series of brushes or similar large surface area devise that provide surface area upon which bubbles form, which, in turn provides for a larger source of oxygen for aerobic bacteria for the converting the biochemical process from an anaerobic one to an aerobic one. The forced introduction of air, oxygen, ozone, or a combination thereof, into the system allows the aerobic bacteria to scour the bio-mat, thereby working to reduce the thickness of the bio-mat and permitting the system to revert back to an anaerobic passive system as originally designed. By using the improved method and apparatus of the present invention, the biochemical process is altered by complete or localized conversion of the soil absorption component as above described. The improved apparatus of the present invention may seem quite simple in practice compared to existing aerobic systems. However, the goal of this improved approach to remediation is value based. The idea is to provide an inexpensive and effective alternative to replacing the absorption system of a septic system. This has been accomplished by the improved method and apparatus of the present invention.

The septic systems described with regard to FIGS. 1-6 are only exemplary systems in which the brushes 62, 162 can be implemented. It will be appreciated that the precise configurations of the septic systems are only for illustrative purposes, and that other types of waste treatment systems (with one or more tanks, different layouts, etc.) can include the brushes.

Various features of the invention are set forth in the following claims.

The invention claimed is:

1. A wastewater treatment apparatus for remediation of a wastewater treatment system having a septic tank with a lower sludge layer and an upper liquid effluent layer, the wastewater treatment apparatus comprising:
   a brush including a brush arm having a first end, a second end, and bristles disposed on the brush arm between the first end and the second end, the bristles defined by perforated tubules arranged in a bundle, wherein the brush is configured to be positioned within the liquid effluent in the septic tank in a vertical orientation such that the second end is disposed below the first end.

2. The wastewater treatment apparatus of claim 1, wherein the first end defines a proximal end of the brush relative to a support of the brush, and the second end defines a distal end of the brush.

3. The wastewater treatment apparatus of claim 1, wherein the brush further includes a float, and wherein the first end of the brush arm is coupled to the float.

4. The wastewater treatment apparatus of claim 3, wherein the brush is one of a plurality of brushes and each of the plurality of brushes is oriented vertically within the tank such that the second ends are disposed below the respective first ends.

5. The wastewater treatment apparatus of claim 4, wherein each of the plurality of brushes includes a plurality of brush arms with first and second ends, wherein each of the plurality of brushes further includes a spacer, and wherein the second ends of each of the plurality of brush arms for the respective plurality of brushes are coupled to the spacer.

6. The wastewater treatment apparatus of claim 5, wherein the second ends are spaced apart from each other along a circumference of the spacer.

7. The wastewater treatment apparatus of claim 6, wherein the circumference of the spacer is substantially circular.

8. A wastewater treatment apparatus for remediation of a wastewater treatment system having a septic tank with a lower sludge layer and an upper liquid effluent layer, the wastewater treatment apparatus comprising:
brushes, each of the brushes including brush arms and a spacer, each of the brush arms having a first end, a second end, and bristles disposed on each of the brush arms between the first end and the second end, the second ends of the respective brush arms for each of the brushes coupled to the spacer,
wherein the brushes are configured to be positioned within the liquid effluent in the septic tank in a spaced apart manner, and
wherein the brushes are configured to be oriented substantially vertically within the liquid effluent with the second end below the first end.

9. The wastewater treatment apparatus of claim 8, wherein each of the brushes further includes a float, and wherein the first ends of the respective brush arms are coupled to the float.

10. The wastewater treatment apparatus of claim 8, wherein the second ends are spaced apart from each other along a circumference of the spacer.

11. The wastewater treatment apparatus of claim 10, wherein the circumference of the spacer is substantially circular.

12. The wastewater treatment apparatus of claim 8, wherein each of the brushes further includes a float coupled to the first ends of the respective brush arms, and a spacer coupled to the second ends of the respective brush arms, and wherein the second ends are spaced apart from each other on the spacer.

13. A method of remediating a wastewater treatment system having a septic tank with a lower sludge layer and an upper liquid effluent layer, the method comprising:
positioning one or more brushes within the liquid effluent layer, each of the one or more brushes including one or more brush arms having a first end, a second end, and bristles disposed between the first end and the second end, the bristles defined by perforated tubules arranged in a bundle; and
orienting each of the one or more brushes substantially vertically within the liquid effluent layer with the second end below the first end.

14. The method of claim 13, further comprising orienting the second end of each of the one or more brush arms disposed below the first end of the same one or more brush arms.

15. The method of claim 13, further comprising floating the one or more brushes within the liquid effluent layer using a float coupled to the first end.

16. The method of claim 15, wherein each of the one or more brushes has as a plurality of brush arms with respective first ends and second ends, the method further comprising spacing apart the second ends of the brush arms from each other.

* * * * *